P. LEONE.
AUTOMATIC CLUTCH.
APPLICATION FILED JULY 29, 1911.
1,028,750.
Patented June 4, 1912.
3 SHEETS—SHEET 2.
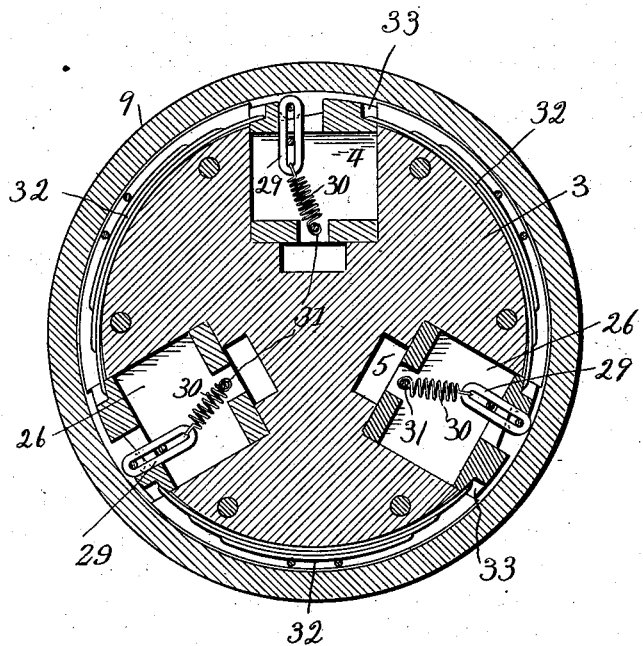
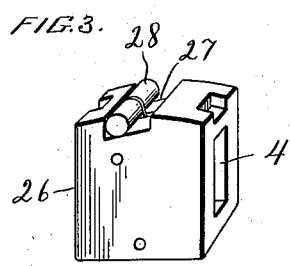
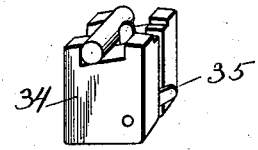
INVENTOR
Pascal Leone,
BY Franklin H. Hough
Attorney
WITNESSES:

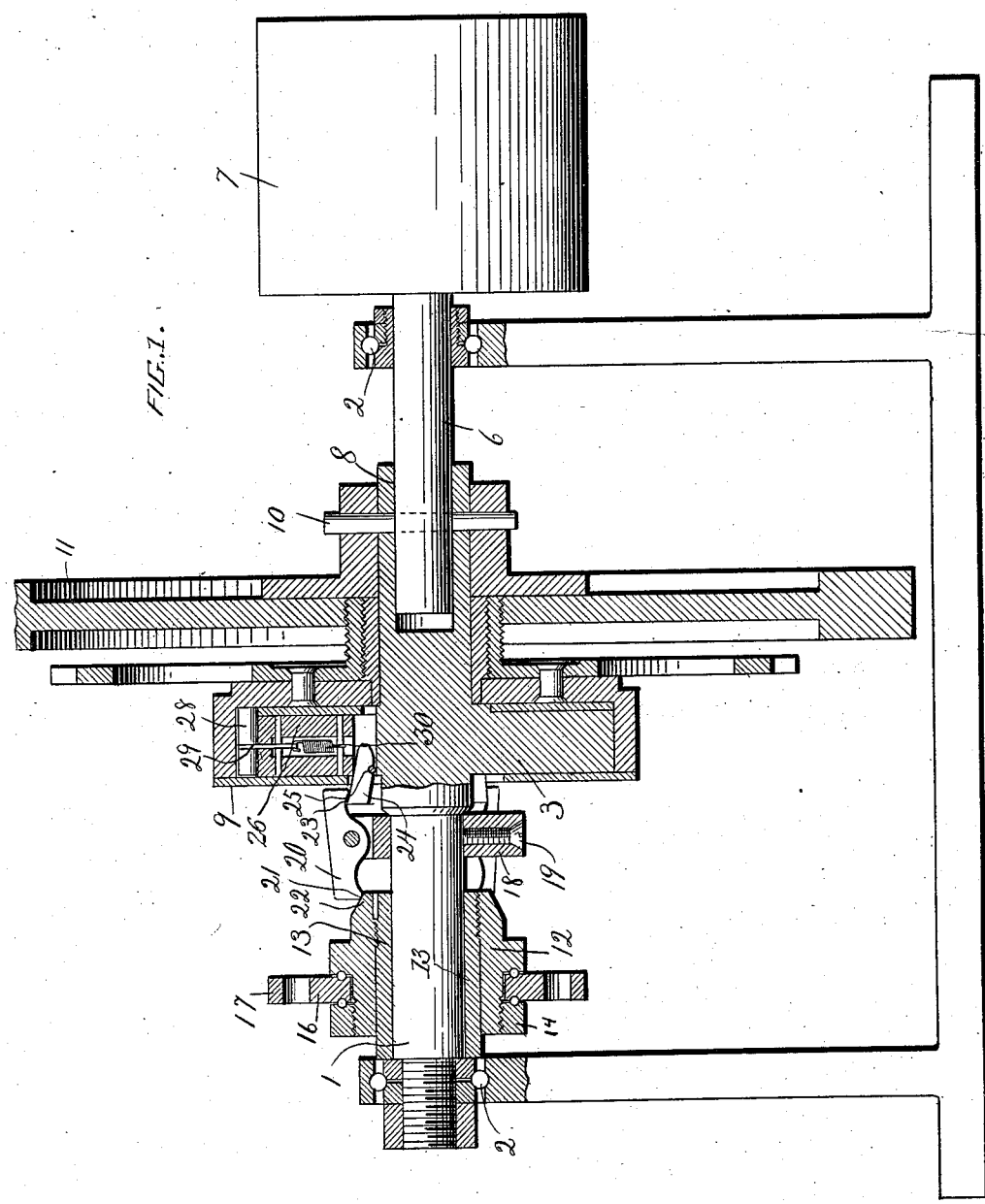

P. LEONE.
AUTOMATIC CLUTCH.
APPLICATION FILED JULY 29, 1911.
1,028,750.
Patented June 4, 1912.
3 SHEETS—SHEET 3.
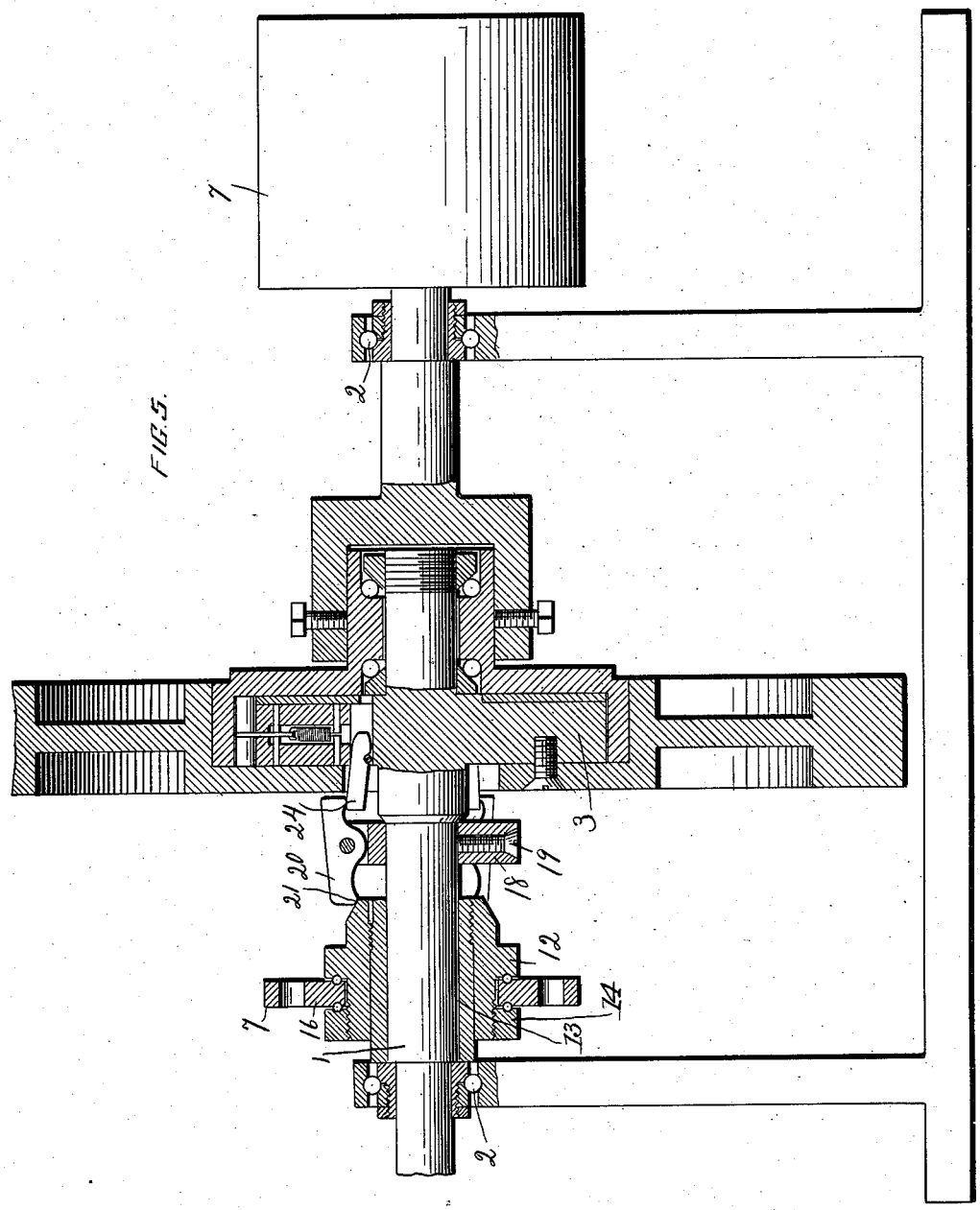
WITNESSES
INVENTOR
Pascal Leone,
BY Franklin N. Hoyt
Attorney

UNITED STATES PATENT OFFICE.

PASCAL LEONE, OF NEW YORK, N. Y.

AUTOMATIC CLUTCH.

1,028,750.  Specification of Letters Patent.  Patented June 4, 1912.

Application filed July 29, 1911. Serial No. 641,307.

*To all whom it may concern:*

Be it known that I, PASCAL LEONE, a subject of the King of Italy, residing at New York city, in the State of New York, have invented certain new and useful Improvements in Automatic Clutches; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in clutches and it has for its object the provision of a simple, inexpensive and efficient clutch, the operation of which is at all times positive and reliable.

The invention has for its further object the provision of a construction wherein the clutch is coincident with the fly wheel, whereby the power is applied to the fly wheel direct when in locked relationship to the shaft upon which it is journaled, the construction being such as to permit of the direct action of the clutch upon the fly wheel, thus avoiding lost motion, in case it is desired at any time to take off the load from the motor.

While, in the present instance, the clutch is shown as coincident with the fly wheel, I desire to have it understood that I do not propose to limit myself to this specific arrangement of the clutch, as it will be at once evident that the clutch is equally adaptable in its action at any point along the shaft.

To these ends and to such others as the invention may pertain, the same consists in the novel construction and in the peculiar arrangement, combination and adaptation of parts, all as will be more fully hereinafter described, shown in the accompanying drawings and then specifically defined in the appended claims.

The invention is clearly illustrated in the accompanying drawings which, with the figures of reference marked thereon, form a part of this specification and in which:—

Figure 1 is a vertical central sectional view of my improved clutch mechanism. Fig. 2 is a central vertical sectional view through the clutch containing case and parts contained therein. Fig. 3 is an enlarged detail perspective view of one of the movable blocks. Fig. 4 is a view of one of the blocks showing a slight modification in its construction, and Fig. 5 is a central vertical sectional view through the clutch mechanism as applied in alinement with the fly wheel.

Reference now being had to the details of the drawings by numeral, 1 designates the main shaft provided with suitable ball bearings 2. Cast integral with said shaft 1 is a disk 3 provided at intervals within its circumference with rectangular recesses 4 communicating at their outer ends with the outer periphery of said disk, each recess communicating at its lower end with the rectangular recesses 5.

6 is a stub shaft connected at one of its ends with the motor or other source of power 7 and having its opposite end inserted within a central opening 8 provided for its reception within the end of the shaft 1 and is secured within said opening by means of a pin 10.

The disk 3 is provided with a suitable closing case 9.

11 is a fly wheel sleeved upon the shaft 1 adjacent to the casing 9 to which, in the construction shown in Figs. 1 and 2, I have shown it bolted or otherwise suitably attached.

12 is a hub having at one of its ends screw threaded connection with a collar 13 sleeved upon the shaft 1, and 14 is a collar interiorly screw threaded to engage threads upon the opposite or outer end of the hub 12.

16 is a ring having integral therewith laterally extended arms 17 adapted for use in moving the hub laterally in the operation of the clutch, as will be more fully hereinafter described.

Interposed between the hub and casing containing the clutch mechanism is a support 18 secured to the shaft by screws 19 or in any other suitable manner.

20 designates pivoted lugs or levers, corresponding in number and relative arrangement with the number and arrangement of the rectangular openings 4 in the disk 3, these levers being pivoted at their longitudinal centers within openings provided therefor in the periphery of the support. Each of these tilting pivot levers is designed to have one of its ends beveled, as at 21, to correspond with the bevel 22 of the inner end of the adjacent hub upon which it bears, and its opposite end is curved slightly downward, as shown at 23, the said curved surface being adapted to engage the correspondingly slightly curved upper edge of the outer end of a lever 24, which latter is fulcrumed over a transverse pin 25 provided within the disk 3, the said lever being inserted through a suitable opening formed in the housing or casing surrounding the disk within the block containing recess 4. 26, 26 designate blocks, each sleeved within said recess 4 in the disk 3, and it will be noted that the inner ends of the tilting levers 24 are adapted to contact with the lower face of the block within the space 5 provided for the reception and movement of the said levers directly below the center of the block. Said block 26 is chambered or recessed longitudinally and at its upper or outer face, which is curved to correspond to the periphery of the disk, is provided with an inclined transverse recess, as indicated at 27.

28 is a roller seated within the inclined recess 27, the said roller being provided at its longitudinal center with a depression within which is seated the upper end of a link 29, the opposite end of which link extends through an opening provided therefor and at its lower end within the said opening is provided with a spring 30, one end of the spring being connected to the link and its opposite end secured to a pin 31 at the lower end of the chamber within the block.

32 are leaf springs conforming to and resting upon the periphery of the disk 3 at positions intermediate of the blocks 26, the ends of said springs 32 entering recesses 33 provided at the opposite outer edges of the said blocks, the tension of the said springs 32 serving to hold the blocks normally in their positions within the recesses in which they are sleeved.

In Fig. 4 of the drawings, I have shown a block of slightly modified form of construction. This block 34 conforms in all respects to the preferred block 26, shown in Fig. 3, and differs therefrom only in being designed to be thrown outward against the tension of the leaf spring 32 by a lever 35 which is actuated by means of a pivoted lever 20, in lieu of the link and spring described in the above description of the form of block shown in Fig. 4 of the drawings.

In Fig. 5 of the drawings, the construction therein shown is in every particular the same as the construction hereinbefore described, excepting that the casing containing the disk and the clutch members connected therewith is embraced within the fly wheel instead of having the case independent of or at one side of the fly wheel, as shown in Fig. 1. This modification is shown in order to clearly demonstrate the fact that the invention is equally adapted for use in connection with gears or with the main shaft independent of the gears.

In operation, a shifting of the collar 13 inwardly, which may be effected automatically in any of the well known ways which are common in effecting the automatic movement of parts in connection with automatic clutch mechanism, will result in imparting a slight upward movement to the tilting lever 20, the beveled outer end of which lever rests upon the outer surface of the end of the hub. This upward movement of the outer end of the lever will effect the corresponding depression of the opposite end of the lever upon the outer end of the tilting lever 24 and the upward movement thus imparted to the opposite end of said lever to the lower face of the block 26 will force the said block slightly outward and cause the roller 28 to assume a different position on the inclined bottom of the recess within which it rests and, when in this position, the roller will contact with the inner face of the periphery of the annular chamber within which the disk is located. Upon the release of the clutch, the tension of the spring 32 connected to the link 29 to which it is attached will cause the roller to again assume its normal position in the opposite end of the slot in which it is seated, thus withdrawing the roller within said seat in the block, as will be readily understood. It will be further noted that, when the rollers are thus withdrawn from contact with the casing, the blocks will be forced back within their recesses and will be normally held therein by the action of the leaf springs 32. This outward movement of the block, it will be noted, overcomes the pressure of the leaf springs which tend to normally hold the block in the chamber within which it is seated and the simultaneous outward movements of the several blocks carried by the disk serve to apply the clutch, and it will be noted that the withdrawal of the said rollers by means of the springs 30 connected to the lower ends of the links 29 will serve to retain the roller.

In the foregoing specification, I have described a construction which I believe to be the preferable one for actuating the clutch mechanism, but it will be at once evident that both the clutch mechanism and its actuating means are subject to many modifications in detail without departing from the principle involved, which contemplates broadly the application of rollers connected with a rotary disk and adapted to be normally held within chambers provided therefor for their reception in the periphery of the disk and to be automatically moved out of alinement with the periphery of the disk and thrown into contact with the circumferential surrounding inner wall of an inclosed chamber and to be automatically withdrawn from such contact and reseated within the inclosed chamber within which the rollers and their connections are carried, upon release of the clutch from its locked relation.

Having thus fully described my invention, what I claim to be new and desire to secure by Letters Patent is:—

1. A clutch mechanism comprising a shaft, a disk rotatable therewith and provided with peripheral recesses, a casing about the disk, blocks movable within the recesses, each block being provided with a recess in its end with an inclined way at the bottom of the recess, a roller upon each inclined way, resilient means for retaining the blocks within their respective recesses, tilting levers engaging the inner ends of the blocks, pivotal levers and a clutch block adapted to contact with the pivotal levers, causing the two sets of levers to actuate the blocks to force the rollers beyond the periphery of the disk to engage the inner circumference of the surrounding portion of the casing, and means for returning the rollers to their normal positions, as set forth.

2. A clutch mechanism comprising a shaft, a disk rotatable therewith and provided with peripheral recesses, a casing about the disk, blocks movable within the recesses, each block being provided with a recess in its end with an inclined way at the bottom of the recess, a roller upon each inclined way, resilient means for retaining the blocks within their respective recesses, tilting levers engaging the inner ends of the blocks, pivotal levers and a clutch block adapted to contact with the pivotal levers, causing the two sets of levers to actuate the blocks to force the rollers beyond the periphery of the disk to engage the inner circumference of the surrounding portion of the casing, springs connected one to each block and the other to the bearing of each roller and serving to return the rollers to their normal positions, as set forth.

3. In a clutch mechanism, in combination with a shaft, a fly wheel carried thereon, a disk rotating with the shaft and having peripheral recesses, a hollow block movable within each recess, the outer end of each block having a recess, the bottom wall of which is inclined, a roller mounted upon each inclined bottom of the recess, a pin passing through the walls of each block, a coiled spring fastened at one end to said pin and its other end to a roller, springs interposed between the disk and the surrounding portion of the casing, the adjacent ends of the springs engaging each an edge of the block, tilting levers each projecting through an opening in the disk and having a bearing against the inner end of a block, and means for tilting said levers to cause the blocks to move against the tension of said springs which are interposed between the disk and casing, as set forth.

In testimony whereof I hereunto affix my signature in the presence of two witnesses.

PASCAL LEONE.

Witnesses:
A. R. FOWLER,
FRANKLIN H. HOYT.

Copies of this patent may be obtained for five cents each, by addressing the "Commissioner of Patents, Washington, D. C."